United States Patent
Hustava et al.

(10) Patent No.: US 10,756,925 B2
(45) Date of Patent: Aug. 25, 2020

(54) SLAVE DEVICE ENHANCING DATA RATE OF DSI3 BUS

(71) Applicant: SEMICONDUCTOR COMPONENTS INDUSTRIES, LLC, Phoenix, AZ (US)

(72) Inventors: Marek Hustava, Bratislava (SK); Tomas Suchy, Brno (CZ); Lukas Vykydal, Olomouc (CZ); Pavel Hartl, Brno (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 6 days.

(21) Appl. No.: 16/359,693

(22) Filed: Mar. 20, 2019

(65) Prior Publication Data
US 2020/0153653 A1    May 14, 2020

Related U.S. Application Data

(60) Provisional application No. 62/760,679, filed on Nov. 13, 2018.

(51) Int. Cl.
*H03M 1/50* (2006.01)
*H04L 12/40* (2006.01)
*H04L 29/08* (2006.01)

(52) U.S. Cl.
CPC ............. *H04L 12/40* (2013.01); *H04L 67/12* (2013.01); *H04L 2012/40273* (2013.01)

(58) Field of Classification Search
CPC ................................. H04L 12/40; H04L 67/12; H04L 2012/40273

USPC .................... 341/50, 51, 68, 69, 63
See application file for complete search history.

(56) References Cited

U.S. PATENT DOCUMENTS

| 8,473,535 B2 | 6/2013 | Perumana et al. |
| 2004/0101046 A1* | 5/2004 | Yang ................. H04N 21/4385 375/240.08 |
| 2018/0046539 A1* | 2/2018 | Takehara ................ H03M 7/00 |

(Continued)

FOREIGN PATENT DOCUMENTS

EP    1505787 A2    2/2005

OTHER PUBLICATIONS

Denso Corporation, Freescale Semiconductor Inc. and TRW Automotive Inc., "DSI3 Bus Standard," Revision 1.00, Feb. 16, 2011, 45 pages.

(Continued)

*Primary Examiner* — Peguy Jean Pierre
(74) *Attorney, Agent, or Firm* — Ramey & Schwaller, LLP (57) ABSTRACT

Disclosed DSI3 slave devices may enhance the data rate of the DSI3 bus using modified nibble encoding, pulse shaping, spectral shaping, and/or message preambles to provide chip time and level tracking. In one embodiment, there is provided a communications method that includes: converting a binary data stream into a ternary unipolar non-return-to-zero level channel signal; and driving the channel signal as an electrical current on a signal conductor. The converting uses an encoder that maps binary nibbles to a set of ternary triplets, each triplet in the set having an average level between 2/3 and 4/3 inclusive, and each triplet including at least one internal transition between levels.

20 Claims, 6 Drawing Sheets

(56) References Cited

U.S. PATENT DOCUMENTS

2019/0312715 A1* 10/2019 Graber ............... H04L 25/4923

OTHER PUBLICATIONS

David Levy, "DSI3 Sensor to master current threshold adaptation for pattern recognition", Int. J. Sig. Proc. Sys., Dec. 2013, v.1 n.2, pp. 141-145.

* cited by examiner

| BITS | CHIPS | | | RS |
|---|---|---|---|---|
| 0000 | 1 | 1 | 0 | 2 |
| 0001 | 2 | 1 | 1 | 4 |
| 0010 | 1 | 0 | 2 | 3 |
| 0011 | 2 | 0 | 2 | 4 |
| 0100 | 1 | 0 | 0 | 1 |
| 0101 | 2 | 1 | 2 | 5 |
| 0110 | 1 | 1 | 2 | 4 |
| 0111 | 2 | 0 | 1 | 3 |
| 1000 | 2 | 2 | 0 | 4 |
| 1001 | 2 | 1 | 0 | 3 |
| 1010 | 1 | 2 | 2 | 5 |
| 1011 | 2 | 2 | 1 | 5 |
| 1100 | 1 | 2 | 0 | 3 |
| 1101 | 2 | 0 | 0 | 2 |
| 1110 | 1 | 0 | 1 | 2 |
| 1111 | 1 | 2 | 1 | 4 |
| CS | 24 | 15 | 15 | |

FIG. 8B

| BITS | CHIPS | | | RS |
|---|---|---|---|---|
| 0000 | 1 | 2 | 0 | 3 |
| 0001 | 2 | 0 | 0 | 2 |
| 0010 | 0 | 2 | 0 | 2 |
| 0011 | 1 | 0 | 1 | 2 |
| 0100 | 1 | 2 | 1 | 4 |
| 0101 | 1 | 1 | 2 | 4 |
| 0110 | 0 | 2 | 1 | 3 |
| 0111 | 1 | 0 | 2 | 3 |
| 1000 | 2 | 1 | 0 | 3 |
| 1001 | 1 | 1 | 0 | 2 |
| 1010 | 0 | 1 | 1 | 2 |
| 1011 | 2 | 0 | 1 | 3 |
| 1100 | 0 | 1 | 2 | 3 |
| 1101 | 2 | 1 | 1 | 4 |
| 1110 | 2 | 0 | 2 | 4 |
| 1111 | 0 | 2 | 2 | 4 |
| CS | 16 | 16 | 16 | |

SLAVE DEVICE ENHANCING DATA RATE OF DSI3 BUS

CROSS-REFERENCE TO RELATED APPLICATIONS

The present application claims priority to provisional U.S. App. 62/760,679, filed 2018 Nov. 13 and titled "DSI3xc Single-Ended Wire Emission and Immunity Enhancements" by inventors Marek Hustava, Tomas Suchy, Lukas Vykydal, and Pavel Hartl. This provisional is hereby incorporated herein by reference.

BACKGROUND

Current and future vehicles are incorporating increasing numbers of on-board sensors and systems to enable or aid critical vehicle functions including Adaptive Cruise Control (ACC), Parking Assistance, Forward Collision Warning (FCW), Forward Collision with Active Braking, Blind Spot Warning (BSW), Lane Keeping Systems (LKS), and others. These technologies provide direct driver assistance in normal driving and critical scenarios, and some are even capable of enhancing driver control or providing autonomous control to prevent or mitigate a crash or negative outcome.

To accommodate the many sensors, actuators, and control systems being employed for such features, manufacturers are implementing increasingly sophisticated data communication networks in each vehicle. The 3rd generation Distributed System Interface (DSI3) standard published by the DSI Consortium (dsiconsortium.org) provides one example of such a communication network.

DSI3 and other communication standards must contend with a unique set of circumstances that challenge their performance. The networks are portable, battery powered (i.e., low voltage), with wire runs long enough to cause (and be susceptible to) electromagnetic interference (EMI). The networks should be resistant to vibration effects, yet remain inexpensive and easy to repair. The DSI3 standard has thrived by offering a number of desirable features including single-conductor communication with optionally integrated power delivery. However, the signal conductor is unshielded and carries a single-ended (as opposed to differential) unipolar signal. Attempts to increase the rate of data communication across the DSI3 bus's single signal conductor are being impaired by the industry's strict limits on EMI emissions.

SUMMARY

Accordingly, there are disclosed herein slave devices that enhance the data rate of the DSI3 bus using modified nibble encoding, pulse shaping, spectral shaping, and/or message preambles to provide chip time and level tracking. In one embodiment, there is provided a communications method that includes: converting a binary data stream into a ternary unipolar non-return-to-zero level channel signal; and driving the channel signal as an electrical current on a signal conductor. The converting uses an encoder that maps binary nibbles to a set of ternary triplets, each triplet in the set having an average level between 2/3 and 4/3 inclusive, and each triplet including at least one internal transition between levels.

In another embodiment, there is provided a slave device that couples to a DSI3 (3rd generation distributed system interface) bus. The slave device includes an encoder that converts a binary data stream into a ternary unipolar non-return-to-zero level data stream; an analog-to-digital converter coupled to the encoder to generate a channel signal that conveys the ternary unipolar non-return-to-zero level data stream; and a driver that drives the channel signal as an electrical current on a signal conductor of the DSI3 bus. The encoder operates by mapping binary nibbles to a set of ternary triplets, each triplet in the set having an average level between 2/3 and 4/3 inclusive, and each triplet including at least one internal transition between levels.

In yet another embodiment, there is provided a method of manufacturing a slave device that couples to an DSI3 (3rd generation distributed system interface) bus. The method includes: creating an encoder to convert a binary data stream into a ternary unipolar non-return-to-zero level data stream; coupling the encoder to an analog-to-digital converter to generate a channel signal that conveys the ternary unipolar non-return-to-zero level data stream; and providing a driver to drive the channel signal as an electrical current on a signal conductor of the DSI3 bus. The encoder is configured to map binary nibbles to a set of ternary triplets, each triplet in the set having an average level between 2/3 and 4/3 inclusive, and each triplet including at least one internal transition between levels.

Each of the foregoing embodiments may be employed separately or conjointly, and may optionally include one or more of the following features in any suitable combination: 1. the signal conductor is a Distributed System Interface (DSI) coupling an automotive sensor to an electronic control unit (ECU). 2. the channel signal conveys contents of the data stream to the ECU at more than 400 kbps. 3. said converting includes filtering a stream of ternary triplets from the encoder using a pulse-shaping filter, the pulse-shaping filter being one of: a sinc filter, a Hann filter, a Hamming filter, a Blackman filter, and a Nuttall filter. 4. said driving includes applying a transmit correction filter to the channel signal to attenuate high-frequency components of the channel signal. 5. the signal conductor couples the channel signal to a receiver having a receive correction filter, the receive correction filter boosting said high-frequency components to compensate for effects of the transmit correction filter. 6. said binary data stream is generated using a scrambling mask. 7. said binary data stream is framed into fixed length messages, each message being preceded by a synchronization preamble. 8. the slave device is an automotive sensor that generates the binary data stream to convey measurements to a electronic control unit (ECU).

DETAILED DESCRIPTION

The attached drawings and following description set out particular embodiments and details for explanatory purposes, but It should be understood that the drawings and corresponding detailed description do not limit the disclosure. On the contrary, they provide a foundation that, together with the understanding of one of ordinary skill in the art, discloses and enables all modifications, equivalents, and alternatives falling within the scope of the appended claims.

Figure 1:
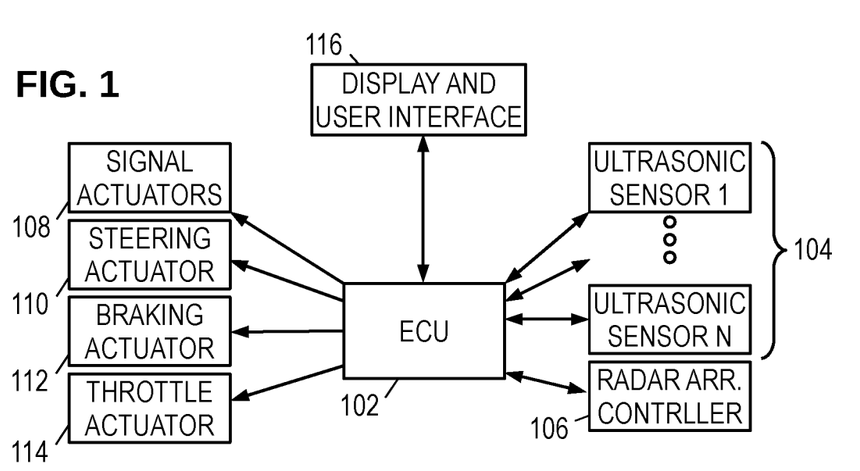
FIG. 1 is a block diagram of an illustrative data communication network.

FIG. 1 shows an electronic control unit (ECU) 102 coupled to the various ultrasonic sensors 104 and a radar array controller 106 as the center of a star topology. Of course, other topologies including serial, parallel, and hierarchical (tree) topologies, are also suitable and contemplated for use in accordance with the principles disclosed herein. The radar array controller 106 couples to the transmit and receive antennas in the radar antenna array to transmit electromagnetic waves, receive reflections, and determine a spatial relationship of the vehicle to its surroundings. To provide automated parking, assisted parking, lane-change assistance, obstacle and blind-spot detection, autonomous driving, and other desirable features, the ECU 102 may further connect to a set of actuators such as a turn-signal actuator 108, a steering actuator 110, a braking actuator 112, and throttle actuator 114. ECU 102 may further couple to a user-interactive interface 116 to accept user input and provide a display of the various measurements and system status.

Various standards exist to support communications between the ECU 102 and the various sensors and actuators. Of particular interest with respect to the present disclosure is the 3rd generation Distributed System Interface (DSI3) bus standard, which provides for half-duplex single-ended signal communication between a bus master device (typically the ECU) and one or more slave devices (e.g., the sensors and actuators). Because the DSI3 bus requires only one signal conductor, it may at times be referred to as a "one-wire" bus.

Figure 2A:
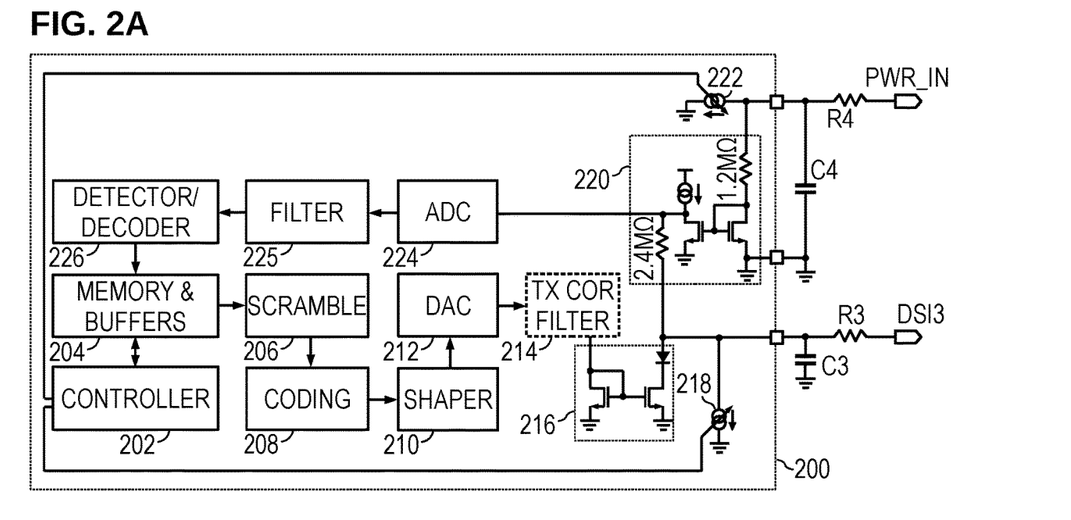
FIG. 2A is a block diagram of an illustrative slave device for a DSI3 bus.

FIG. 2A is a block diagram of an illustrative slave device 200 suitable for use on a standard DSI3 bus. While maintaining physical compatibility with the DSI3 standard, the illustrative device 200 includes certain features to enhance communications performance, at least some of which extend the standard in a way that may necessitate a firmware adjustment in the bus master device as discussed further below. Other features can be employed to enhance performance without departing from full compatibility with the existing standard. The disclosed features, which can be employed individually or in various combinations, include: (1) pulse shaping, (2) spectral shaping, (3) scrambling, and (4) modified nibble encoding.

Slave device 200 includes a controller 202 that collects measurements and buffers relevant messages in memory 204 for communicating the measurement data to the bus master device. While the message length can be varied, in at least one contemplated embodiment each message is 16 bytes and may begin with or be preceded by a preamble that is one or two nibbles in length. A scrambler 206 masks each message with a pseudorandom binary sequence using a bitwise exclusive-or (XOR) operation to randomize or "whiten" any repeating data patterns. If present, the preamble is not masked, so as to preserve the preamble pattern in the scrambler's output bitstream. The seed for the pseudorandom sequence may vary for each message and may vary for each slave device.

A channel encoder 208 encodes the bitstream from the scrambler 206 by mapping each nibble to a corresponding triplet of channel symbols. Each triplet includes three ternary channel symbols. Channel symbols are also referred to herein as "chips" and are transmitted as one of three unipolar non-return-to-zero levels: 0, 1, or 2, each symbol having a fixed symbol duration which may be about 3 or 4 microseconds. As provided in the standard, "0" may correspond to a quiescent channel signal current of $I_Q$. A "1" may correspond to a response channel signal current of $I_Q+I_{RESP}$, and a "2" may correspond to a response channel signal current of $I_Q+2I_{RESP}$. In at least some embodiments, $I_Q$ is limited to no more than 2 mA, and $I_{RESP}$ is approximately 12 mA. Some contemplated embodiments may switch from three-level signaling to two level signaling to improve noise immunity. In such embodiments, the channel encoder 208 maps 8-bit bytes to 8-bit codewords, in this case only $I_Q$ and $I_Q+2I_{RESP}$ current levels are used.

A pulse-shaping filter 210 may operate on the channel symbol stream from the encoder 208, providing a transfer function that converts rectangular pulses (e.g., NRZ chips) into smoother pulse shapes that provide the channel signal with more desirable spectral properties. One contemplated embodiment of the pulse-shaping filter 210 is a sinc filter such as that shown in FIG. 6. Filters that provide pulse shapes with raised-cosine roll-offs are also contemplated. More specifically, the contemplated pulse shaping filter types include a Hann filter, a Hamming filter, a Blackman filter, and a Nuttall filter. A digital-to-analog converter 212 operates on the filtered channel signal to convert it from digital form to analog form, which herein may be termed the uplink channel signal. A transmit correction filter 214 may operate on the uplink channel signal to further shape the channel signal spectrum as discussed further below with respect to FIGS. 3, 4A, and 4B. To be clear, the transmit correction filter 214 can be omitted, combined with the pulse shaping filter 210, implemented as a separate digital filter, or implemented as shown (a separate analog filter).

A channel driver 216 converts the uplink channel signal into an electrical current on an input/output pin of the slave device 200. A low pass RC filter (capacitor C3, resistor R3) couples the input/output pin to the signal conductor of the DSI3 bus.

Current biasing of the input/output pin is provided by a current sink 218 and a receive buffer 220. Controller 202 adjusts the current sink 218 as needed for biasing during the forward (downlink) and reverse (uplink) communication phases of the half-duplex DSI3 communication protocol. During the downlink communication phase, the input/output pin receives a downlink channel signal in the form of an electrical voltage signal. Receive buffer 220 provides a high input impedance for the input/output pin, buffering the downlink channel signal for the analog-to-digital converter 224.

A downlink receive filter 225 may limit the digital receive signal bandwidth and/or enhance signal to noise ratio of the downlink signal. In at least some embodiments, the filter 225 operates to suppress noise above 300 kHz. In system embodiments where the master device employs a transmit correction filter (similar to filter 214 above), the downlink receive filter 225 may include a compensation function to boost downlink signal frequencies up to about 150 kHz, before rolling off to suppress noise at signal frequencies above about 250 or 300 kHz.

A symbol detector and decoder 226 operates on the filtered receive signal to determine the command type and associated payload, placing the information in the receive buffer for the controller 202 to use when formulating a response.

FIG. 2A shows both a pulse-shaping filter 210 and a transmit correction filter 214. Either or both of these filters may be omitted. The filter order can also be interchanged, with the digital-to-analog conversion occurring before, between, or after the filtering operations.

Figure 2B:
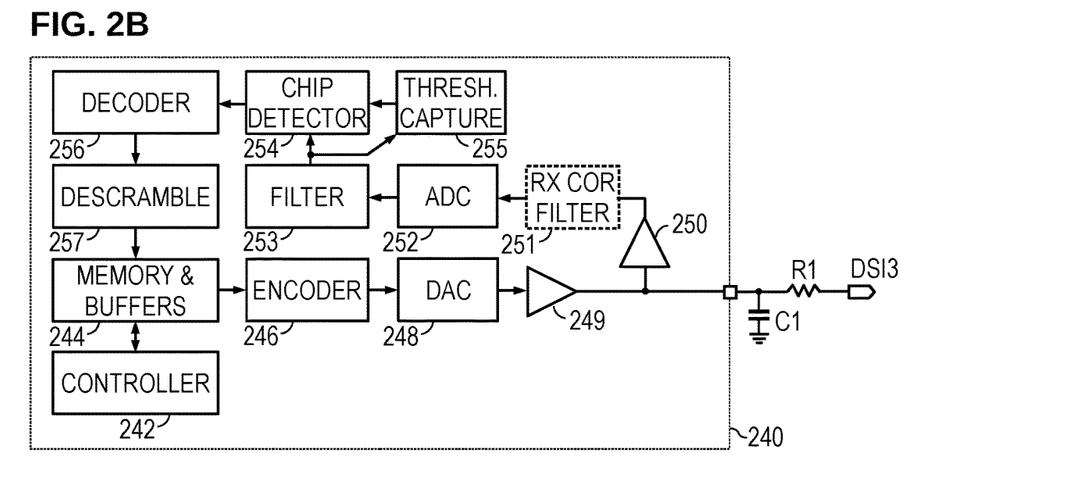
FIG. 2B is a block diagram of an illustrative master device for a DSI3 bus.

FIG. 2B is a block diagram of an illustrative bus master device 240 suitable for use on a standard DSI3 bus. As with the slave device 200, the master device 240 maintains physical compatibility with the DSI3 standard, but includes certain features to enhance uplink communication performance when employed in conjunction with a compatible slave device.

Master device 240 includes a controller 242 that formulates downlink messages in memory 244 for communication to one or more slave devices. A channel encoder 246 encodes the binary downlink messages by mapping bits 0 and 1 to upward and downward channel voltage transitions as provided by, e.g., Manchester-1 encoding. A digital-to-analog converter 248 converts the encoded signal into an analog downlink signal. A driver 249 supplies the analog downlink signal as a voltage signal to an input/output pin of the master device 240. Though the DSI3 standard provides for a 2 volt swing between "high" and "low" symbol voltages, some contemplated embodiments employ a 4 volt swing to enhance noise immunity. A low pass RC filter (capacitor C1, resistor R1) couples the input/output pin to the signal conductor of the DSI3 bus.

A high impedance receive buffer 250 couples the uplink signal from the input/output pin to an optional receive correction filter 251. The optional receive correction filter 251 may, e.g., boost high frequency content of the uplink signal to compensate for operation of the transmit correction filter 214. An analog to digital converter 252 digitizes the uplink signal, and an uplink receive filter 253 operates on the digital signal to limit signal bandwidth and/or enhance signal-to-noise ratio. Filter 253 may be a matched filter, having a filter response based at least in part on the pulse shape provided by the pulse shaping filter 210. Filters 251 and 253 can be re-ordered, merged into a single filter, and each implemented in digital or analog form.

A chip detector 254 operates on the filtered uplink signal to detect channel symbol levels. A threshold capture unit 255 may capture and/or adapt comparator threshold levels for the chip detector 254 based at least in part on the message preambles as discussed further below. A decoder 256 operates on the channel symbol sequence from the chip detector 254, inverting the operation of encoder 208 to map the chip triplets to binary nibbles. A descrambler 257 operates on the bitstream from the decoder 256, inverting the operation of the scrambler 206 to extract the message data sent by the slave device. The message data may be stored in memory 244 for analysis and use by controller 242.

The illustrative slave device illustrated in FIG. 2A employs a channel driver 216 and receive buffer 220 that operates with reference to ground. We observe here that the ground node can drift with respect to the ground used by the master device, typically in a symmetric fashion with the drift experienced by the voltage supply nodes of the master and slave devices. (The symmetry is a result of the power supply conductor impedances on the DSI3 bus.) Consequently, a greater degree of noise immunity can be achieved if, rather than using the ground node as a reference for signal transmission and reception, the slave and master devices use a half-voltage reference. That is, the master device splits the difference between its supply voltage and ground voltage to determine the reference voltage for transmitting the downlink signal, and the slave device splits the difference between its supply voltage and ground voltage to determine the reference voltage for receiving the downlink signal. Accordingly, at least some contemplated embodiments of the slave and master devices use a half-voltage node as the reference voltage for sending and receiving signals on the DSI3 bus.

Figure 3:
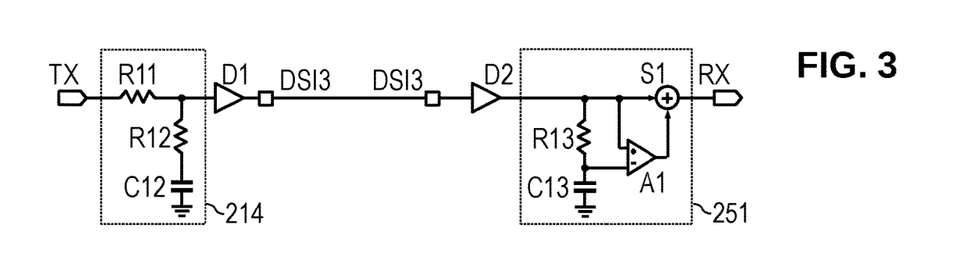
FIG. 3 is a schematic illustrating a spectral shaping technique.
Figure 4A:
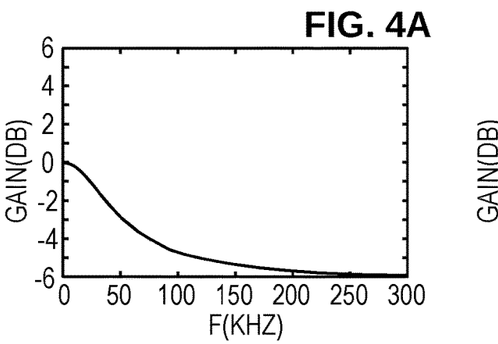
FIG. 4A is a graph of a transmit correction filter's frequency response.
Figure 4B:
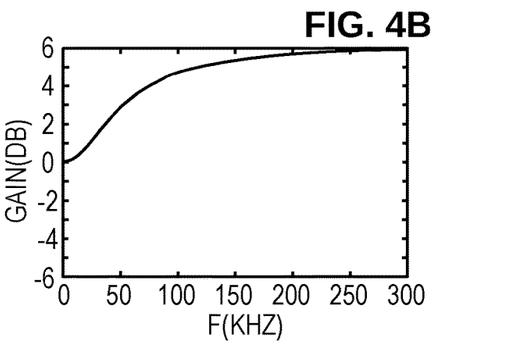
FIG. 4B is a graph of a receive correction filter's frequency response.

FIG. 3 is a schematic illustrating the operation of, and relationship between, transmit correction filter 214 and receive correction filter 251. In the illustrative implementation of FIG. 3, transmit correction filter 214 employs a low pass RC filter configuration (R11 and C12, with capacitor C12 having a series resistance R12) to provide 6 dB of attenuation for signal frequencies above about 200 kHz as shown in FIG. 4A. Transmit correction filter 214 is employed on the transmit side to facilitate channel signal compliance with industry-specified EMC (electromagnetic compatibility) limitations. At the receive side, a receive buffer D2 supplies the channel signal to a receive correction filter 251. The receive correction filter employs an RC shunt (R13 and C13), with an amplifier A1 coupled across the resistance R13 to measure and amplify the high frequency signal components. A summer 51 adds the amplifier output to the receive signal to boost the high frequency signal content in a way that compensates for the operation of the transmit correction filter. Thus, as shown in FIG. 4B, signal frequencies above about 200 kHz are boosted by 6 dB of gain.

Figure 5A:
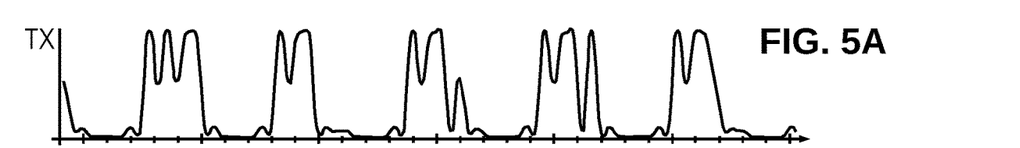
FIG. 5A is a graph of an illustrative transmit signal.
Figure 5B:
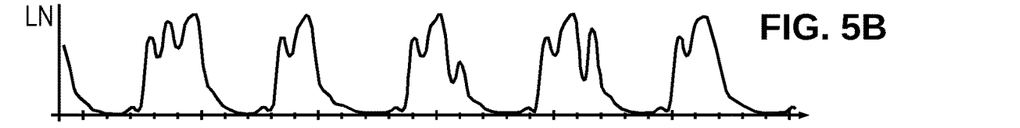
FIG. 5B is a graph of an illustrative line signal after spectral shaping.
Figure 5C:
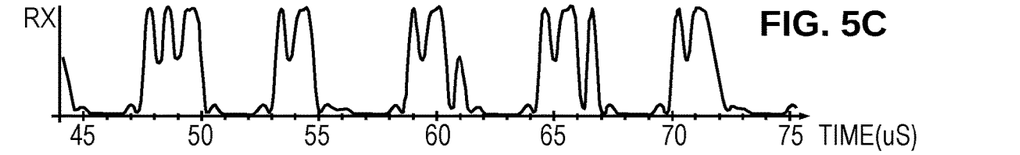
FIG. 5C is a graph of an illustrative receive signal after correction.

To further illustrate the correction filter operations, FIG. 5A shows an illustrative transmit signal TX generated by spaced-apart one-byte (two-triplet) messages. (In practice, uplink messages would generally be longer.) Transmit correction filter 214 attenuates the high frequency signal components of the transmit signal, yielding the line signal LN shown in FIG. 5B. At the receiver, the receive correction filter 251 restores the high frequency components, yielding the receive signal RX shown in FIG. 5C. It can be seen that FIG. 5C very closely resembles FIG. 5A.

Figure 6:
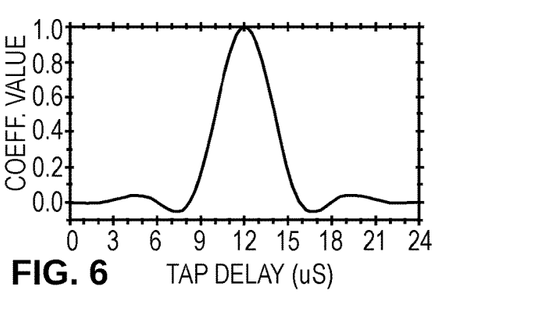
FIG. 6 is a graph of illustrative sinc filter coefficients.

In the presence of channel noise, the receive correction filter 251 may have the undesired effect of boosting the noise and thereby reducing the signal to noise ratio of the receive signal. Such boosting can be limited, or avoided, by using the pulse shaping filter to limit the high frequency content of the transmit signal in the first place, relaxing or eliminating the need for high frequency attenuation by the transmit correction filter. For example, FIG. 6 is a graph of coefficient values suitable for a pulse shaping filter 210. By softening the transitions of a traditional rectangular pulse, the pulse shaping filter reduces the high frequency content of the channel signal.

Figure 7:
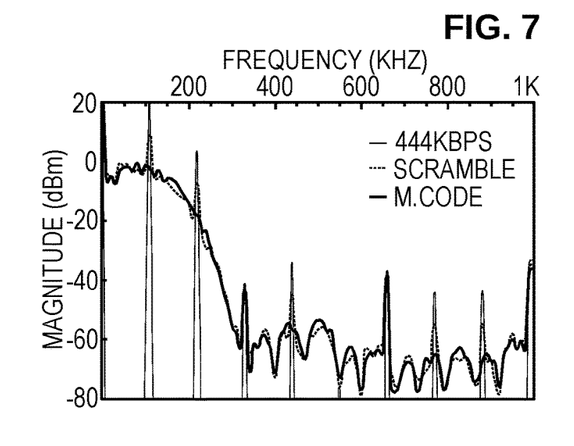
FIG. 7 is a graph comparing spectra of different transmit signals.

Scrambling and coding can be used to provide further control of the channel signal spectrum. FIG. 7 compares spectra of channel signals under three different conditions. An illustrative channel signal transmitted with a chip duration of 3 microseconds by a slave device lacking any measures to limit electromagnetic interference has a spectrum given by the first curve labeled "444 kbps". This spectrum has particularly strong harmonics, with first harmonic peak at about 110 kHz having the same magnitude as the baseband peak.

If the slave device applies a scrambling mask to whiten the bitstream before transmission, the spectrum is given by the second curve labeled "Scramble". Scrambling reduces the magnitude of the first harmonic peak by 11.6 dB relative to the baseband peak. While this improvement is substantial, the harmonic energy remains undesirably high and may not satisfy the industry's electromagnetic compatibility requirements.

Figure 8A:
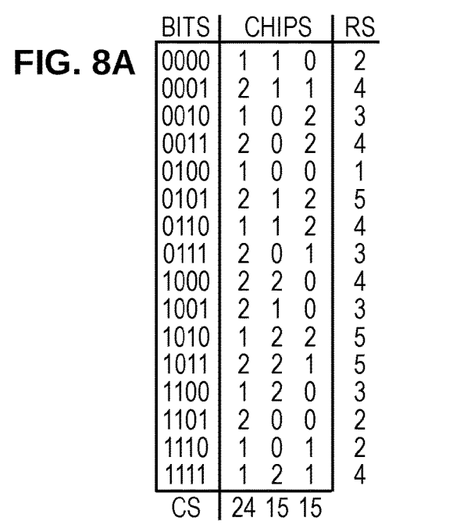
FIG. 8A is a table of a first illustrative nibble code.
Figure 8B:
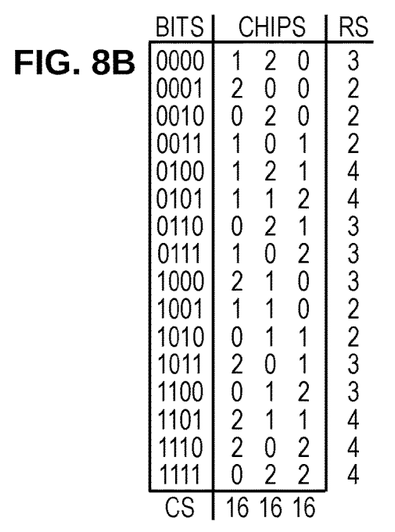
FIG. 8B is a table of a modified nibble code.

Before discussing the final curve in FIG. 7, we turn to FIGS. 8A and 8B. FIG. 8A is a table of the encoder map from the 16 possible 4-bit nibbles to respective triplets of ternary channel symbols. We note that there are 27 possible triplets of ternary symbols. In designing this encoder map, the DSI3 standard discarded some of the possible triplets. In particular, the triplets that begin with "0" are discarded, leaving 18 possible triplets. Of these, the standard also discards those triplets having the same value for all three chips in order to guarantee at least one transition in each triplet. The 16 remaining triplets are those used in the table.

The table of FIG. 8A further includes a row sum (RS) for each ternary triplet and a column sum (CS) for each chip in the triplets. We note that the column sum for the first chip is 60% larger than the other column sums. Consequently the signal energy in a sequence of triplets gets unevenly distributed among the chips, being preferentially concentrated in the first chip and thereby producing a strong harmonic at 110 kHz.

FIG. 8B is a table of a modified encoder map which provides a greater balance of signal energy among the chips and reduces variation of the row sums relative to the table of FIG. 8A. As with FIG. 8A, each of the triplets in FIG. 8B includes at least one internal transition between chip values. Using this modified code in combination with the scrambling mask, the slave device produces a channel signal having the spectrum given by the third curve labeled "M.Code" in FIG. 7. The harmonic peak at 110 kHz is suppressed 22 dB relative to the baseband peak. Accordingly, the use of a modified code is expected to significantly aid in meeting the industry's electromagnetic compatibility requirements.

Though harmonic peaks are still evident at, e.g., 330 kHz, 440 kHz, and 660 kHz, the use of a pulse shaping filter and/or spectral shaping filter is expected to suppress these peaks.

With the use of the modified code, it is noted that some of the triplets now begin with "0". To assure that messages are detected when they start, slave devices may prepend a preamble to each message to guarantee that the first chip is nonzero. The preamble may further be chosen to provide timing synchronization and decision threshold training as described below.

Figure 9:
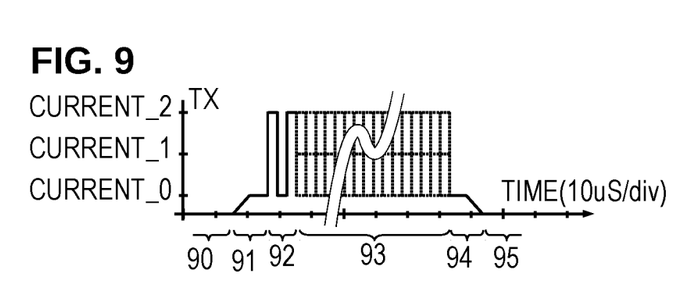
FIG. 9 is a graph of an illustrative transmit message template.

FIG. 9 shows an illustrative message template for use by the slave device. The template begins after an idle period 90 in which, e.g., a downlink message is detected. As the slave device transitions to a transmit mode, there is a "Fade in" interval 91 during which the slave device begins sourcing an electrical current corresponding to a "0" signal level for at least the duration of one chip. A preamble 92 indicates the beginning of a message. The illustrated preamble is a 2-0-2 triplet. In another contemplated embodiment, the preamble is a 2-0-2 triplet followed by a 0-2-0 triplet. Other preambles would also be suitable, including a single chip having a nonzero value.

The message 93 is a sequence of triplets from the modified encoder map (FIG. 8B). In at least one embodiment, the message 93 consists of 32 triplets to convey 16 bytes of binary message data. The message 93 is followed by a fade out interval 94 during which the slave device transitions out of the transmit mode. The slave device begins listening again during the subsequent idle period 95.

Figure 10A:
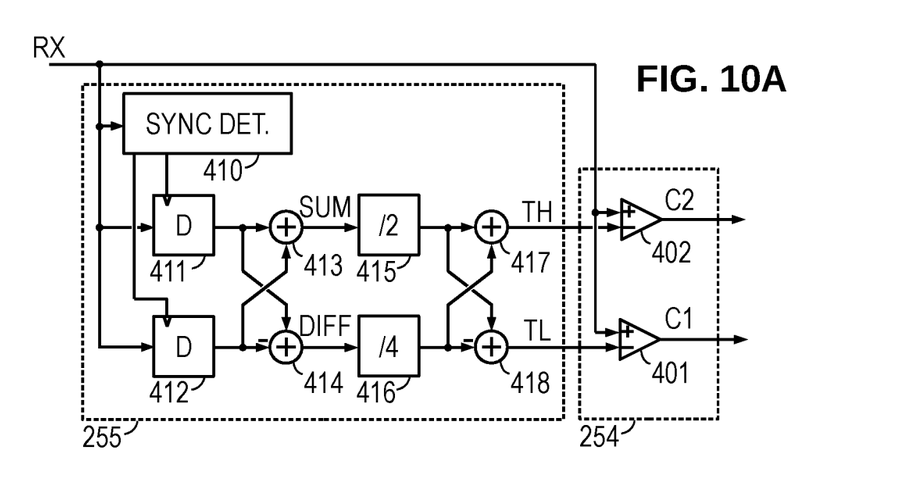
FIG. 10A is a block diagram of a first illustrative threshold capture unit.
Figure 10B:
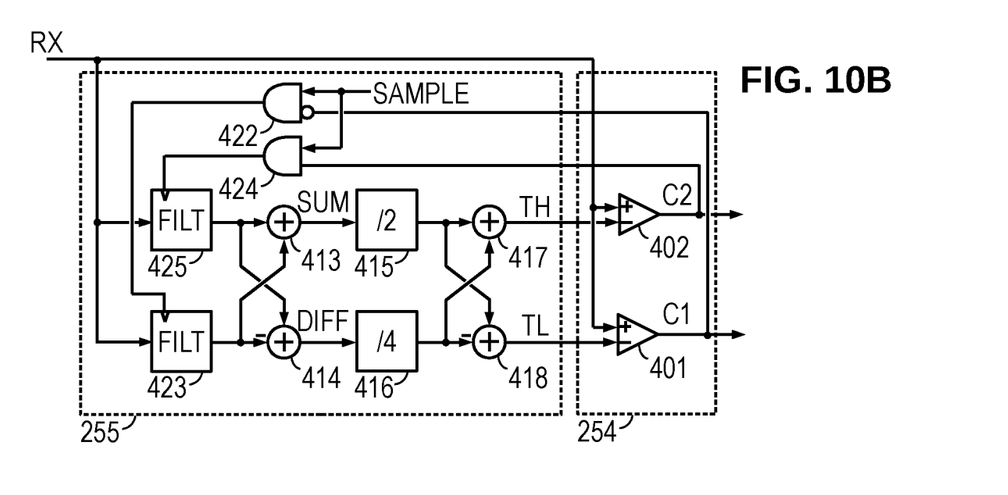
FIG. 10B is a block diagram of a second illustrative threshold capture unit.

The preamble can be used to capture and/or train the threshold values used by the chip detector 254. FIGS. 10A-10B show illustrative embodiments of a threshold capture unit 255 that determines the threshold values using the 2-0-2 preamble.

In FIG. 10A, an illustrative chip detection unit 254 includes a first comparator 401 and a second comparator 402. Comparator 401 compares the receive signal RX to a low threshold TL, providing an output signal C1 that is asserted if the RX signal is above TL and deasserted if RX is below TL. Similarly, comparator 402 compares the receive signal RX to a high threshold TH, providing an output signal C2 that is asserted if RX is above TH and deasserted if RX is below TH. The threshold TL is set midway between the current levels corresponding to 0 and 1, while TH is set midway between the current levels corresponding to 1 and 2. Thus C1 and C2 are both deasserted when the RX signal corresponds to the 0 current level. C1 is asserted and C2 deasserted when the RX signal corresponds to the 1 current level. Both C1 and C2 are asserted when the RX signal corresponds to the 2 current level.

As the slave device enters the transmit mode, a synchronization detector 410 monitors the RX signal to detect the preamble. In at least some contemplated embodiments, the sync detector 410 detects the RX signal exceeding a predetermined threshold and remaining above that predetermined threshold for at predetermined duration. For example, the predetermined threshold may roughly correspond to a "1" current level and the predetermined duration may correspond to half of a chip interval. Upon detecting the preamble, the sync detector may provide rising clock edges for latches 411 and 412 at suitable delays with respect to the detection. The clock for latch 411 may be triggered immediately upon detection or at two chip durations after the detection, while the clock for latch 412 may be triggered at one chip duration after the detection. In either case, latch 411 captures an RX signal value corresponding to a "2" while latch 412 captures an RX signal value corresponding to a "0".

The captured RX signal values are added by a summer 413 to obtain their sum, and subtracted by a summer 414 to determine their difference. A divider 415 then determines their average (which corresponds to a "1"), while a second divider 416 divides the difference by 4 (which corresponds to a threshold offset of "0.5"). Summer 417 adds the offset to the average to obtain the high threshold TH. Summer 418 subtracts the offset from the average to obtain the low threshold TL. The threshold capture unit then provides the TH and TL values to the chip detector 254 for detecting the chip values of the ensuing message.

FIG. 10B employs a similar threshold determination method, but rather than relying on a preamble detector 419, the illustrated unit 255 initially uses default threshold values TH, TL to detect the chip values. During a sampling period, i.e., when the SAMPLE signal is asserted, the AND gate 422 triggers a clock signal for a filter 423 when the chip detector detects a "0" chip value. AND gate 424 triggers a clock signal for a filter 423 when the chip detector detects a "2" chip value. Filters 423, 425 combine values of the corresponding chip values within the sample window to provide a filtered "0" and "2" value, which the components 413-418 use to determine the TH and TL values as described previously. After a predetermined time, or once the TH and TL values converge, the SAMPLE signal is deasserted.

Figure 10C:
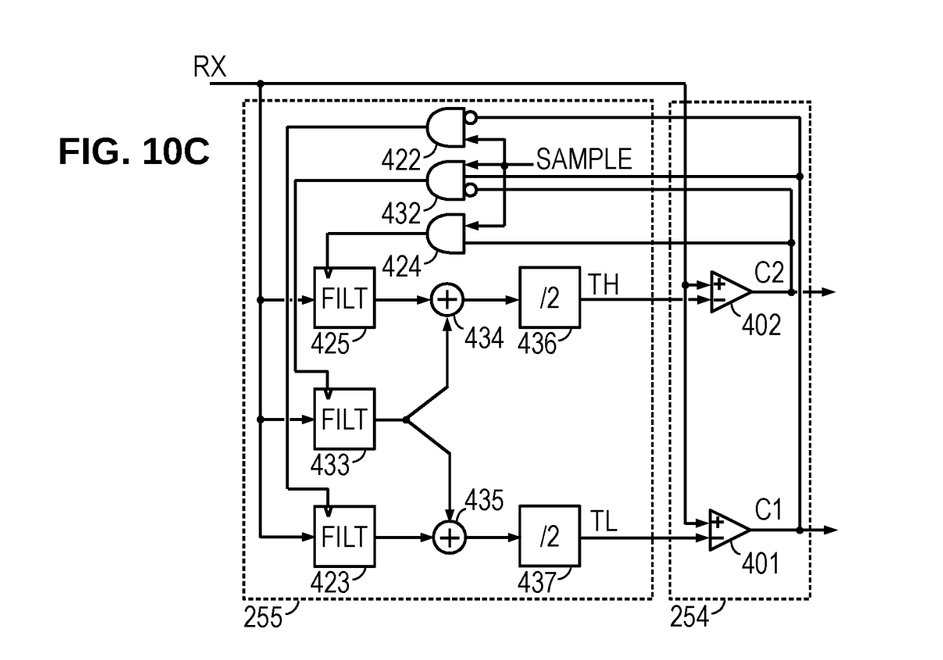
FIG. 10C is a block diagram of a third illustrative threshold capture unit.

The unit 255 of FIG. 10C includes AND gates 422, 424 which supply clock signals to filters 423, 425 when "0" and "2" chip values are detected during the sampling period. In addition, an AND gate 432 triggers a clock signal to a filter 433 when a "1" chip value is detected during the sampling period. A summer 434 sums the filtered "1" and "2" chip values, and a divider 436 calculates the average for use as high threshold TH. Another summer 435 sums the filtered "0" and "1" values, and a divider 437 calculates the average for use as a low threshold TL.

Though it is contemplated that the sampling will be done only during preambles, some contemplated embodiments employ adaptive threshold tracking continuously during communications. Different threshold values may be tracked for each slave device connected to the bus master device. These and numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A communications method that comprises:
   converting a binary data stream into a ternary unipolar non-return-to-zero level channel signal using an encoder that maps binary nibbles to a set of ternary triplets, each triplet in the set having an average level between 2/3 and 4/3 inclusive, and each triplet including at least one internal transition between levels; and
   driving the channel signal as an electrical current on a signal conductor.

2. The method of claim 1, wherein the signal conductor is a Distributed System Interface (DSI) coupling an automotive sensor to an electronic control unit (ECU).

3. The method of claim 1, wherein said converting includes filtering a stream of ternary triplets from the encoder using a pulse-shaping filter, the pulse-shaping filter being one of: a sinc filter, a Hann filter, a Hamming filter, a Blackman filter, and a Nuttall filter.

4. The method of claim 1, wherein said driving includes applying a transmit correction filter to the channel signal to attenuate high-frequency components of the channel signal.

5. The method of claim 4, wherein the signal conductor couples the channel signal to a receiver having a receive correction filter, the correction filter boosting said high-frequency components to compensate for effects of the transmit correction filter.

6. The method of claim 1, wherein said binary data stream is generated using a scrambling mask.

7. The method of claim 1, wherein said binary data stream is framed into fixed length messages, each message being preceded by a synchronization preamble.

8. A slave device that couples to an DSI3 (3rd generation distributed system interface) bus, the slave device including:
   an encoder that converts a binary data stream into a ternary unipolar non-return-to-zero level data stream by mapping binary nibbles to a set of ternary triplets, each triplet in the set having an average level between 2/3 and 4/3 inclusive, and each triplet including at least one internal transition between levels;
   an analog-to-digital converter coupled to the encoder to generate a channel signal that conveys the ternary unipolar non-return-to-zero level data stream; and
   a driver that drives the channel signal as an electrical current on a signal conductor of the DSI3 bus.

9. The slave device of claim 8, wherein the slave device is an automotive sensor that generates the binary data stream to convey measurements to a electronic control unit (ECU).

10. The slave device of claim 8, further comprising a pulse shaping filter that filters the ternary unipolar non-return-to-zero level data stream to provide a pulse-shaped signal to the analog-to-digital converter, the pulse-shaping filter being one of: a sinc filter, a Hann filter, a Hamming filter, a Blackman filter, and a Nuttall filter.

11. The slave device of claim 8, further comprising a transmit correction filter that filters the channel signal to attenuate high-frequency components of the channel signal before the driver drives the signal on the signal conductor.

12. The slave device of claim 11, wherein the signal conductor couples the channel signal to a receiver having a receive correction filter, the receive correction filter boosting said high-frequency components to compensate for effects of the transmit correction filter.

13. The slave device of claim 8, further comprising a scrambler that uses a scrambling mask to generate the binary data stream.

14. The slave device of claim 8, further comprising a controller that frames said binary data stream is framed into fixed length messages, each message being preceded by a synchronization preamble.

15. A method of manufacturing a slave device that couples to an DSI3 (3rd generation distributed system interface) bus, the method including:
   creating an encoder to convert a binary data stream into a ternary unipolar non-return-to-zero level data stream by mapping binary nibbles to a set of ternary triplets, each triplet in the set having an average level between 2/3 and 4/3 inclusive, and each triplet including at least one internal transition between levels;
   coupling the encoder to an analog-to-digital converter to generate a channel signal that conveys the ternary unipolar non-return-to-zero level data stream; and
   providing a driver to drive the channel signal as an electrical current on a signal conductor of the DSI3 bus.

16. The method of claim 15, further comprising packaging the slave device as an automotive sensor that generates the binary data stream to convey measurements to a electronic control unit (ECU.

17. The method of claim 15, wherein said coupling is performed via a pulse shaping filter that filters the ternary unipolar non-return-to-zero level data stream to provide a pulse-shaped signal to the analog-to-digital converter, the pulse-shaping filter being one of: a sinc filter, a Hann filter, a Hamming filter, a Blackman filter, and a Nuttall filter.

18. The method of claim 15, further comprising coupling the analog-to-digital converter to the driver via a transmit correction filter that filters the channel signal to attenuate high-frequency components of the channel signal before the driver drives the signal on the signal conductor.

19. The method of claim 15, further comprising: providing a scrambler that uses a scrambling mask to generate the binary data stream.

20. The method of claim 15, further comprising: configuring the encoder to frame the ternary unipolar non-return-to-zero level data stream into fixed length messages, each message being preceded by a synchronization preamble.

* * * * *